United States Patent
Zhou et al.

(10) Patent No.: US 11,433,566 B2
(45) Date of Patent: Sep. 6, 2022

(54) DURABLE PALM FIBER COMPOSITE MATERIAL AND PREPARING METHOD THEREOF

(71) Applicant: Southwest Forestry University, Kunming (CN)

(72) Inventors: Xiaojian Zhou, Kunming (CN); Guanben Du, Kunming (CN); Jun Zhang, Kunming (CN); Jinxing Li, Kunming (CN); Bin Li, Kunming (CN); Taohong Li, Kunming (CN)

(73) Assignee: SOUTHWEST FORESTRY UNIVERSITY, Kunming (CN)

( * ) Notice: Subject to any disclaimer, the term of this patent is extended or adjusted under 35 U.S.C. 154(b) by 362 days.

(21) Appl. No.: 16/729,489

(22) Filed: Dec. 30, 2019

(65) Prior Publication Data

US 2020/0368936 A1    Nov. 26, 2020

(30) Foreign Application Priority Data

May 21, 2019  (CN) .......................... 201910421984.3

(51) Int. Cl.
| | |
|---|---|
| *B27M 1/02* | (2006.01) |
| *B27K 3/02* | (2006.01) |
| *B27K 3/34* | (2006.01) |
| *B27K 5/00* | (2006.01) |
| *B27M 1/08* | (2006.01) |

(52) U.S. Cl.
CPC ............. *B27M 1/02* (2013.01); *B27K 3/0278* (2013.01); *B27K 3/343* (2013.01); *B27K 5/007* (2013.01); *B27M 1/08* (2013.01); *B27K 5/001* (2013.01); *B27K 2200/30* (2013.01)

(58) Field of Classification Search
CPC ...... B27K 3/0278; B27K 3/343; B27K 5/007; B27K 5/001; B27M 1/02; B27M 1/08
See application file for complete search history.

(56) References Cited

U.S. PATENT DOCUMENTS

2020/0140606 A1 * 5/2020 Jensen ................ C08G 63/912

FOREIGN PATENT DOCUMENTS

WO    WO-2008018784 A1 *  2/2008 ............... B27D 1/04

OTHER PUBLICATIONS

General Administration of Quality Supervision et al., Test methods of evaluating the properties of wood-based panels and surface decorated wood-based panels; Nov. 12, 2013.

* cited by examiner

*Primary Examiner* — Michael P Wieczorek

(74) *Attorney, Agent, or Firm* — Bayramoglu Law Offices LLC

(57) ABSTRACT

A durable palm fiber composite material is obtained by impregnating an unprocessed palm bark in a resin adhesive solution prepared by using a palm leaf as a raw material and then hot-pressing. The palm bark is dried under a natural state without additional processing. The palm leaf is made into a tannin resin adhesive solution under the effect of additives such as furfuryl alcohol, paraformaldehyde, and others. A pH value of the adhesive solution is controlled to be 9-11. A solid content is 40-60%. An adhesive amount applied to the palm bark by the resin adhesive solution is 800-1500 g/m². Odd number of layers (three or more layers) of palm barks that are impregnated by the resin adhesive solution and are hot-pressed to the composite material. Hot-pressed parameters are as follows: the temperature is 150-180° C. the unit pressure is 0.8-1.5 MPa, and the time is 10-30 s/mm.

7 Claims, No Drawings

DURABLE PALM FIBER COMPOSITE MATERIAL AND PREPARING METHOD THEREOF

CROSS REFERENCE TO THE RELATED APPLICATIONS

This application is based upon and claims priority to Chinese Patent Application No. 201910421984.3, filed on May 21, 2019, the entire contents of which are incorporated herein by reference.

TECHNICAL FIELD

The present invention generally belongs to the technical field of forestry engineering and forestry processing, and more particularly relates to a durable palm fiber composite material and a preparing method thereof.

BACKGROUND

A wood-based panel is a composite material made of fibrous plant raw materials formed into different shapes bonding with adhesives, there are many species. The resources used for wood-based panels, however, are becoming scarce, and the custom furniture is becoming more and more popular. Therefore, the demand for high-quality wood-based panels has increased. Wood fiber manufactured composite materials have a low production cost, superior quality, and are less toxic.

SUMMARY

The purpose of the present invention is to provide a durable palm fiber composite material. The composite material is obtained by impregnating a raw palm bark without being processed chemically in a resin adhesive solution prepared by using a palm leaf liquefied product as a raw material, and then hot-pressing, thereby achieving full utilization of palm-based raw materials.

The technical solution of the present invention is a durable palm fiber composite material. The durable palm fiber composite material uses palm bark as a substrate, and the palm bark is immersed in a resin adhesive prepared by using palm leaves as a raw material. The impregnated multilayer palm bark is obtained by hot pressing.

Further, the above palm tree bark is a raw palm tree bark cut from an unprocessed palm.

Further, the above method for preparing the resin adhesive solution by using the palm leaf raw material includes the following steps:

S1. grinding the palm plant, extracting water, filtering, leaching and evaporating the ground palm leaf to obtain a pre-concentration solution; and S2. mixing the pre-concentration solution obtained in step S1 with furfuryl alcohol (Furan-2-yl) methanol and paraformaldehyde and then stirring the mixture to obtain the resin adhesive solution.

Further, the conditions of the water-extracting in step S1 are as follows: hot water with a temperature of 60-80° C., a water-extracting time of 2-4 hours, and a ratio of raw material to solution of 1: (15-20).

Further, in step S1, a solid content of the obtained pre-concentration solution after the filtering, leaching and evaporating is 40-60%, pH is 4.5-5.5, and viscosity is 300-400 mPa·s.

Further, an amount of furfuryl alcohol in step S2 is 20-50% of the solid mass of the pre-concentration solution by weight; and an amount of paraformaldehyde is 8-15% of the solid mass of the pre-concentration solution by weight.

Further, the resin adhesive solution obtained in the above step S2 is a brown liquid in appearance, and step S2 further comprises steps of adjusting the pH of the obtained resin adhesive solution to be a pH between 9 and 11 and controlling the viscosity to be within a range of 400-600 mPa·s.

The present invention further provides a method for preparing the above durable palm fiber composite material, including:

B1. impregnating the palm bark in the resin adhesive solution until coated sufficiently;

B2. placing and overlapping the resin adhesive impregnated palm bark in a layer organized in the same pattern as the naturally occurring pattern of bark bases and bark tips are arranged. i.e. in an alternating pattern. The placement of the resin adhesive impregnated palm bark is done until formed to a predetermined size; and then laying a second layer, until a predetermined number of layers is reached; and B3. hot-pressing the resin adhesive impregnated palm bark layers laid in the predetermined size and the predetermined number of layers to obtain the durable palm fiber composite material.

Further, an amount of the resin adhesive solution for impregnating the palm bark in the above step B1 is as follows: the palm bark per $m^2$ is impregnated with 800-1500 g of the resin adhesive solution; in step B2, a size of an overlapped part of any two palm barks at base and tip is controlled within 3-10 cm; due to anisotropic characteristics of the palm bark, following a plywood assembly process, the paved number of layers is set to be an odd number of layers, at least three or more layers (including three layers); in the step B3, the hot-pressed process parameters are as follows: the temperature is 150-180° C., the unit pressure is 0.8-1.5 MPa, the time is 10-30 s/mm, and a water content of the palm bark after being impregnated by the resin is controlled to be within 10-20% before hot-pressing.

The durable palm fiber composite material in the present invention is a type of high quality and environmentally friendly composite material obtained from the palm bark under the effect of the resin adhesive solution prepared by using the palm leaf liquefied product. 99% of the raw materials used for the durable palm fiber composite material are renewable resources. The durable palm fiber composite material has reached the requirement of national standard of Test Methods of Evaluating The Properties of Wood-based Panels and Surface Decorated Wood-based Panels, GB/T17657-2013. The durable palm fiber composite material has met all necessary criteria for national standards including physical properties, chemical properties, durability, water resistance, stability, ease of processing, and others.

The preparing method in the present invention can sufficiently make use of biomass resources, thereby realizing high-quality and efficient utilization of all components of the palm plant. Moreover, non-toxic additives are added during the preparation of the resin adhesive solution and the composite material, and the processing procedure and the product both are environmentally friendly.

DETAILED DESCRIPTION OF THE EMBODIMENTS

In order to make those skilled in the art understand the present invention better, the present invention is further illustrated in detail in reference to specific embodiments below.

Embodiment 1

The palm leaf is ground, and then extracting and processing is performed on the ground palm leaf with hot water. The processing conditions are as follows: the temperature is 60° C. the time is 2 hours, and the ratio of the material to the solution is 1:15. A solid content of the pre-concentration solution after the filtering, leaching and evaporating is controlled to be 40%, and pH is 4.5. Furfuryl alcohol that occupies 20% of the solid mass of the pre-concentration solution and paraformaldehyde that occupies 8% of the solid mass of the pre-concentration solution are added to the pre-concentration solution, and the mixture is stirred uniformly. At this time, the resin adhesive solution is a brown liquid in appearance. The pH of the system is adjusted to be 9, and viscosity is controlled to be 400 mPa·s. The palm bark is impregnated in the adjusted adhesive solution, allowing it to be impregnated sufficiently, where an impregnation amount is controlled to be 800 g/m². The impregnated palm bark is overlapped to form a pattern in a size of 80×50 cm with bases and tips arranged alternately. The water content of the impregnated palm bark before being laid and overlapped is controlled to be 15%, a size of the overlapped part of any two palm barks at the base and tip is controlled to be 10 cm, and a number of the paved layers is five. The overlapped and paved palm barks are subjected to a hot-pressing process with a temperature of 150° C. and unit pressure of 0.8 MPa and time of 10 s/mm to obtain a durable palm fiber composite material.

Embodiment 2

The palm leaf is ground, and then extracting is performed on the ground palm leaf with hot water. The processing conditions are as follows: the temperature is 80° C., the time is 4 hours, and the ratio of the material to the solution is 1:20. A solid content of the pre-concentration solution after the filtering, leaching and evaporating is controlled to be 60%, and pH is 5.5. Furfuryl alcohol that occupies 50% of the solid mass of the pre-concentration solution and paraformaldehyde that occupies 15% of the solid mass of the pre-concentration solution are added to the pre-concentration solution, and the mixture is stirred uniformly. At this time, the resin adhesive solution is a brown liquid in appearance. The pH of a system is adjusted to be 11, and viscosity is controlled to be 600 mPa·s. The palm bark is impregnated in the adjusted adhesive solution, allowing it to be impregnated sufficiently, where an impregnation amount is controlled to be 1000 g/m². A water content of the impregnated palm bark before being overlapped is controlled to be 15%, the impregnated palm bark is overlapped to form a pattern in a size of 100×80 cm with a base and tip alternative arrangement, a size of the overlapped part of any two palm barks at the base and tip is controlled to be 10 cm, and a number of the paved layers is five. The overlapped and paved palm barks are subjected to a hot-pressing process with a temperature of 180° C. and material unit pressure of 1.5 MPa and time of 30 s/mm to obtain a durable palm fiber composite material.

Basic properties of the durable palm fiber composite materials obtained in Embodiment 1 and Embodiment 2 are shown in the following Table 1.

TABLE 1

Basic properties of durable palm fiber composite materials obtained in the embodiments of the present invention

| Property | Density (g/cm³) | Tensile strength (MPa) | Elasticity modulus (GPa) | Thickness swelling rate of water absorption (%) |
| --- | --- | --- | --- | --- |
| Embodiment 1 | 0.98 | 47 | 3.4 | 15% |
| Embodiment 2 | 1.12 | 56 | 5.8 | 10% |

Table 1 shows that the palm fiber composite material has a higher physical mechanical strength and a lower thickness swelling rate of water absorption, which satisfies the requirements of panel property in Test Methods of Evaluating The Properties of Wood-based Panels and Surface Decorated Wood-based Panels, GB/T17657-2013 of relevant national standard.

The above has described the respective embodiments of the present invention, and the above explanations are exemplary rather than being exhaustive. Moreover, the present invention is not limited to the disclosed respective embodiments. The protection scope of the present invention should fall to the protection scope of the claims.

What is claimed is:
1. A method for preparing a durable palm fiber composite material comprising:
   B0, using a palm bark as a substrate,
   B1, impregnating the palm bark substrate in a resin adhesive solution, wherein the resin adhesive solution is prepared by using a palm leaf as a raw material comprising:
      S1, grinding the palm leaf, and water-extracting, filtering, leaching and evaporating the ground palm leaf to obtain a pre-concentration solution comprising tannin; and
      S2, mixing the pre-concentration solution obtained at the step S1 with furfuryl alcohol and paraformaldehyde and then stirring the mixture uniformly to obtain the resin adhesive solution;
   B2, placing and overlapping multiple resin adhesive solution impregnated palm bark substrates to form a multi-layer palm bark, wherein each of the layers is prepared by overlapping the palm barks impregnated with the resin adhesive solution to form a format in a predetermined size with bases and tips of the palm barks arranged alternately; and
   B3, hot-pressing the multi-layer palm bark after being placed in the predetermined size and the predetermined number of layers to obtain the durable palm fiber composite material.
2. The method for preparing the durable palm fiber composite material of claim 1, wherein, an amount of the resin adhesive solution for impregnating the palm barks in the step B1 is as follows: the palm bark per m² is impregnated with 800-1500 g of the resin adhesive solution;
   in the step B2, a size of an overlapped part of any two palm barks overlapped at the bases and the tips is controlled within 3-10 cm; the predetermined number of layers is an odd number of layers, wherein the odd number is equal to or more than three;

in the step B3, in the hot-pressing a hot-pressing temperature is 150-180° C., a hot-pressing unit pressure is 0.8-1.5 MPa, and a hot-pressing time is 10-30 s/mm, and a water content of the palm barks after being impregnated with the resin is controlled within 10-20% before the hot-pressing.

3. The method of claim 1, wherein, the palm bark is a raw palm bark cut from a palm tree without being processed chemically.

4. The method of claim 1, wherein, conditions of the water-extracting in the step S1 are as follow: a hot water temperature is 60-80° C., water-extracting time is 2-4 hours, and a ratio of the raw material to the solution is 1: (15-20).

5. The method of claim 1, wherein, in the step S1, a solid content of the obtained pre-concentration solution after the filtering, leaching and evaporating is controlled to be 40-60%, pH is 4.5-5.5, and viscosity is 300-400 mPa·s.

6. The method of claim 1, wherein, in the step S2, an amount of furfuryl alcohol is 20-50% of a solid mass of the pre-concentration solution by weight; and an amount of paraformaldehyde is 8-15% of the solid mass of the pre-concentration solution by weight.

7. The method of claim 1, wherein, the resin adhesive solution obtained in the step S2 is a brown liquid in appearance, and the step S2 further comprises steps of adjusting the pH of the obtained resin adhesive solution to be 9-11 and controlling the viscosity within 400-600 mPa·s.

\* \* \* \* \*